(12) United States Patent
Larsson et al.

(10) Patent No.: US 7,177,769 B2
(45) Date of Patent: Feb. 13, 2007

(54) APPARATUS, METHOD AND COMPUTER PROGRAM PRODUCT FOR MODELLING CAUSALITY IN A FLOW SYSTEM

(75) Inventors: Jan Eric Larsson, Lund (SE); Fredrik Dahlstrand, Lund (SE); Bengt Öhman, Lund (SE)

(73) Assignee: GoalArt AB, Lund (SE)

( * ) Notice: Subject to any disclaimer, the term of this patent is extended or adjusted under 35 U.S.C. 154(b) by 133 days.

(21) Appl. No.: 10/503,481

(22) PCT Filed: Jan. 31, 2003

(86) PCT No.: PCT/SE03/00161

§ 371 (c)(1),
(2), (4) Date: Jul. 30, 2004

(87) PCT Pub. No.: WO03/065139

PCT Pub. Date: Aug. 7, 2003

(65) Prior Publication Data
US 2005/0096854 A1    May 5, 2005

(30) Foreign Application Priority Data
Feb. 1, 2002  (SE)  ..................... 0200285

(51) Int. Cl.
  *G01F 1/00* (2006.01)
  *G06F 15/00* (2006.01)
(52) U.S. Cl. ...................... 702/45; 702/182
(58) Field of Classification Search ............ 702/45, 702/50, 81, 82, 105, 182, 183, 185, 186, 702/189, 196; 714/25, 26; 717/104; 707/3, 707/4; 703/2, 7

See application file for complete search history.

(56) References Cited

U.S. PATENT DOCUMENTS 5,914,875 A    6/1999    Monta et al.

(Continued)

OTHER PUBLICATIONS

Johannes Petersen "Knowledge based Support for Situation Assessment in Human Supervisory Control". Department of Automation Technical University of Denmark 2000.http://www.cs.auc.dk/pba/preprints/thesis.pdf. ISBN 87-87950-84-7 see chapter 5-6, 8.

(Continued)

*Primary Examiner*—Bryan Bui
(74) *Attorney, Agent, or Firm*—Ladas & Parry LLP

(57) ABSTRACT

The present invention refers to an apparatus, a method and a computer program product for modelling causality in a flow system, and more specifically for modelling variable causality in the flow system. The apparatus 100 comprises a data storage means 110 configured to store model element data related to modelled components of the flow system, a causal rule storage means 120 configured to store a plurality of causal relations determining the causal relationships between model elements. The apparatus 100 comprises a state determination unit 130 arranged to receive a status signal from the flow system, identify the component related to the received status signal, identify a model element modelling the identified component and determine an operating state of the identified component. Further, the apparatus comprises a processing means 140 configured to activate or deactivate a causal relation related to the identified model element and dependent on the determined operating state.

25 Claims, 9 Drawing Sheets

U.S. PATENT DOCUMENTS 6,223,143 B1     4/2001   Weinstock et al.
6,480,814 B1*   11/2002   Levitan .......................... 703/2
2004/0133289 A1*   7/2004   Larsson et al. ............... 700/83

OTHER PUBLICATIONS

Patent Abstract of Japan, vol. 1996, No. 08, Aug. 30, 1996 & JP 08087412 A (HITACHI Ltd.) Apr. 2, 1996. See the whole document.

* cited by examiner

| | | | Effect | | | | | |
|---|---|---|---|---|---|---|---|---|
| | | | First function | | | Second function | | |
| | | | $S_{00}$ | $S_{01}$ | $S_{02}$ | $S_{10}$ | $S_{11}$ | $S_{12}$ |
| Cause | First function | $S_{00}$ | 1 | | | 1 | | |
| | | $S_{01}$ | | 1 | | | 1 | |
| | | $S_{02}$ | | | 1 | | | 1 |
| | Second function | $S_{10}$ | | | 1 | 1 | | |
| | | $S_{11}$ | | 1 | | | 1 | |
| | | $S_{12}$ | 1 | | | | | 1 |

| | | | Effect | | | | | |
|---|---|---|---|---|---|---|---|---|
| | | | First function | | | Second function | | |
| | | | $S_{00}$ | $S_{01}$ | $S_{02}$ | $S_{10}$ | $S_{11}$ | $S_{12}$ |
| Cause | First function | $S_{00}$ | 1 | | | | | |
| | | $S_{01}$ | | 1 | | | | |
| | | $S_{02}$ | | | 1 | | | |
| | Second function | $S_{10}$ | | | 1 | 1 | | |
| | | $S_{11}$ | | 1 | | | 1 | |
| | | $S_{12}$ | 1 | | | | | 1 |

APPARATUS, METHOD AND COMPUTER PROGRAM PRODUCT FOR MODELLING CAUSALITY IN A FLOW SYSTEM

FIELD OF THE INVENTION

The present invention refers to an apparatus, a method and a computer program product for modelling causality in a flow system, and more specifically for modelling variable causality in the flow system.

BACKGROUND OF THE INVENTION

Flow systems, such as industrial systems, can be described and modelled in several ways, and the models obtained are used for many different tasks, such as supervision, control, measurement validation, alarm analysis, fault diagnosis and sensor fault detection.

Flow systems can for example be modelled by a model comprising qualitative descriptions of the system or by a so-called rule-based model, i.e., a model modelling the system using rules or logical statements describing how different components of the system interact with each other.

Today more sophisticated models for modelling industrial system are available, for example so-called causal models. A causal model is a model, which models parts of the system and the causal relationship between different parts, e.g. components, of the system, i.e., how the parts affect each other.

One example of a causal model is the so-called functional model. Functional models are used to model flow systems by identifying the overall goal the system must achieve, the functions the system must perform to fulfil the goal, and the behaviour of the physical structure in order to realise the functions. For example, the modelled system can be an electronic device, a process control system in a factory, customer-service activities in a bank, a robot, or the entire Internet.

The strength of functional modelling is in its ability to cope with the complexity in large flow systems. This is due to the fact that the overall goal and functions in complex flow systems are many and often very hard to recognise using classical modelling methods. Thus, functional modelling has been used to describe functions of human-machine systems, to perform diagnosis and planning in industrial plants, and to identify failures and their consequences in such plants.

One example of a functional model is the multilevel flow model (MFM). The basic idea of MFM is to model a man-made system designed and used with certain purposes in mind. The main strength of a multilevel flow model is that it is easy to build a model of a target system using MFM. Thus, MFM is preferably used in the modelling of large flow systems.

Multilevel flow models (MFM) are models using a graphical language representing the goals and functions of complex systems. The main strength of MFM is the ability to describe very complex systems using a small number of modelling element, also called functions. For each of the legal connections between the MFM functions, a set of causal rules is defined. These causal rules describe how qualitative states of the functions affect each other. The causal rules may be used with one or more diagnostic method, such as, alarm analysis, discrete sensor validation, or failure mode analysis.

In a flow system it may not always be true that two connected components affect the operating condition of each other. Thus, this must also be implemented in the model of the flow system, i.e., how two connected functions affect the state of each other.

In MFM it is assumed that all connected functions, modelling parts of the flow system, affect each other in both directions. For example it is obvious that a pump providing water to a closed tank affects the water level in the tank and that the level in the tank also affects the flow through the pump. If the level in the tank is too high, the pump will not be able to transport more water to the tank since the tank is full, thus the flow through the tank will be too low. However, if the tank is open instead of closed the level in the tank will not affect the flow through the pump, but the water will just flow over the edges of the tank rather than blocking the flow through the pump. A drawback with MFM of today is that it can not handle this latter case, since it is assumed in MFM that all connected components or parts of the flow system affect each other. As illustrated above, this may not always be the case.

Another drawback with MFM is that it can not handle the case when the casual relationship between connected components for example changes over time. For example, MFM can not model the case when the closed tank described above has a removable lid, which is removed during the operation of the flow system. Thus MFM can not model the case when a flow system in a first operation state has a lid and in a second operation state has not a lid.

One solution to the above-mentioned problem would be to provide more MFM symbols or model elements to represent various types of objects such as open tanks, closed tanks, centrifugal pumps, etc. However, this solution quickly becomes unmanageable, since it may be difficult to find the appropriate symbol to use in a specific system, and the modelling effort quickly becomes difficult.

In the Ph.D. thesis "Knowledge based support for situation assessment in human supervisory control" by Johannes Petersen, DTU Lyngby, Denmark, 2000, 00-A-897, ISBN 87-87950-84-7, an MFM model for handling some special cases of causality is disclosed. However, Petersen does not provide a general solution of the problem and thus the causality between all functions, used to model the flow system, is not possible. It is for example in the system disclosed by Petersen not possible to handle causality of a transport function or a barrier function, and Petersen does not propose a solution to the problem.

Further, with the disclosed system it is not possible to handle the causality dynamically, i.e. it is not possible to handle the case when the influence two connected functions affects each other with changes over time or due to other parameters controlling the operation states of the components of the flow system.

The system disclosed by Petersen is thus a static system and does not provide a general solution of how to model dynamical causalities of a flow system.

Further, no one known to the inventors of the present invention provides a solution to the problem of modelling, in a general and dynamical way, the causality between connected model elements modelling a flow system without increasing the modelling complexity.

OBJECT OF THE INVENTION

An object of the invention is thus to provide an apparatus, a method and a computer program to solve the above mentioned problems. More specifically, the object of the present invention is to provide an apparatus, a method and a computer program product that in a general and dynamical way models the causality between connected model elements modelling a flow system.

An aim of the object is to provide an apparatus, a method and a computer program for describing the direction of the causal relationships between functions of the model.

Another aim is to provide an apparatus, a method and a computer program providing dynamical handling of changes in the direction of the causal relationships over time.

SUMMARY OF THE INVENTION

The present invention refers to an apparatus, a method and a computer program product fulfilling the above-mentioned object. Thus the invention refers to an apparatus, a method and a computer program product for modelling causality in flow system by means of a model devised to model components of said flow system and causal relationships between said components.

The apparatus according to the invention comprises a data storage means configured to store model element data related to said modelled components and a causal rule storage means configured to store a plurality of causal relations determining the causal relationships between said model elements. In one embodiment of the invention, the causal rule storage means is configured to store one causal relation per operating state of said model element, and said causal relation is preferably stored as a causal rule matrix.

Further, the apparatus comprises a state determination unit comprising a receiving means configured to receive or retrieve from said flow system a status signal relating to a component thereof. The state determination unit comprises also an identifying means configured to identify said component related to said received status signal and to identify a model element modelling said identified component. A determining means configured to determine an operating state of said identified component dependent on said status signal is also comprised in said state determination unit. In one embodiment of the invention, the determining means is arranged to determine said operating state based on a logical function of said status signal and the determining means can also be arranged to provide a state of said identified component.

Further, the apparatus comprises a processing means communicatively coupled to said data storage means, said causal rule storage means and said state determination unit, and configured to activate or deactivate a causal relation related to said identified model element and dependent on said determined operating state. In one embodiment of the invention, the processing means is further configured to dynamically activate or deactivate a causal relation during the operation of the flow system.

The apparatus according to the invention can also be communicatively connected to a service unit, which is communicatively coupled to and controllable by means of said processing means. The service unit can be arranged to execute steps of a diagnostic method, such as measurement validation, alarm analysis, fault diagnosis or sensor fault detection, utilising said state and said activated causal relation.

The method according to the invention comprises the steps of receiving or retrieving from a flow system a status signal relating to a component thereof, identifying the component related to the received status signal, identifying a model element modelling the identified component, determining an operating state of the identified component dependent on the status signal, and activating or deactivating a causal relation related to the identified model element and dependent on the determined operating state.

In one embodiment of the invention the step of activating or deactivating a causal relation is performed dynamically during the operation of the flow system.

The causal rule storage means stores a causal relation for an operating state of a model element. Further the causal rule storage means stores said causal relation as an instance of a causal rule matrix.

In one embodiment of the invention, the step of determining the operating state comprises further the step of determining the operating state based on a logical function of the status signal. Further, the determining means provides a state of said identified component.

According to one embodiment of the invention method, the processing means controls a service unit to execute steps of a diagnostic method utilising said state and said activated causal relation.

The invention refers also to a computer program product for use in a computerised apparatus for modelling causality in a flow system by means of a model devised to model components of said flow system and causal relationships between said components. The computer program product comprises means for storing model element data related to the modelled components and means for storing a plurality of instances of causal relations determining the causal relationships between said model elements. The computer program product comprises further means for state determination, which means comprises means for receiving from said flow system a status signal relating to a component thereof, means for identifying said component related to said received status signal and for identifying a model element modelling said identified component. The means for state determination comprises further means for determining an operating state of said identified component dependent on said status signal. Further, the computer program product comprises means for activating or deactivating an instance of a causal relation related to said identified model element and dependent on said determined operating state.

The model used in the present invention to model the flow system is a qualitative model, a rule based model or a functional model, such as a multilevel flow model.

BRIEF DESCRIPTION OF THE DRAWINGS

The present invention will be described with reference to the following drawings, in which FIG. 1a schematically shows an embodiment of an apparatus according to the invention and FIG. 1b schematically shows functional parts of an embodiment of the invention.

DEFINITIONS

Figure 1A:
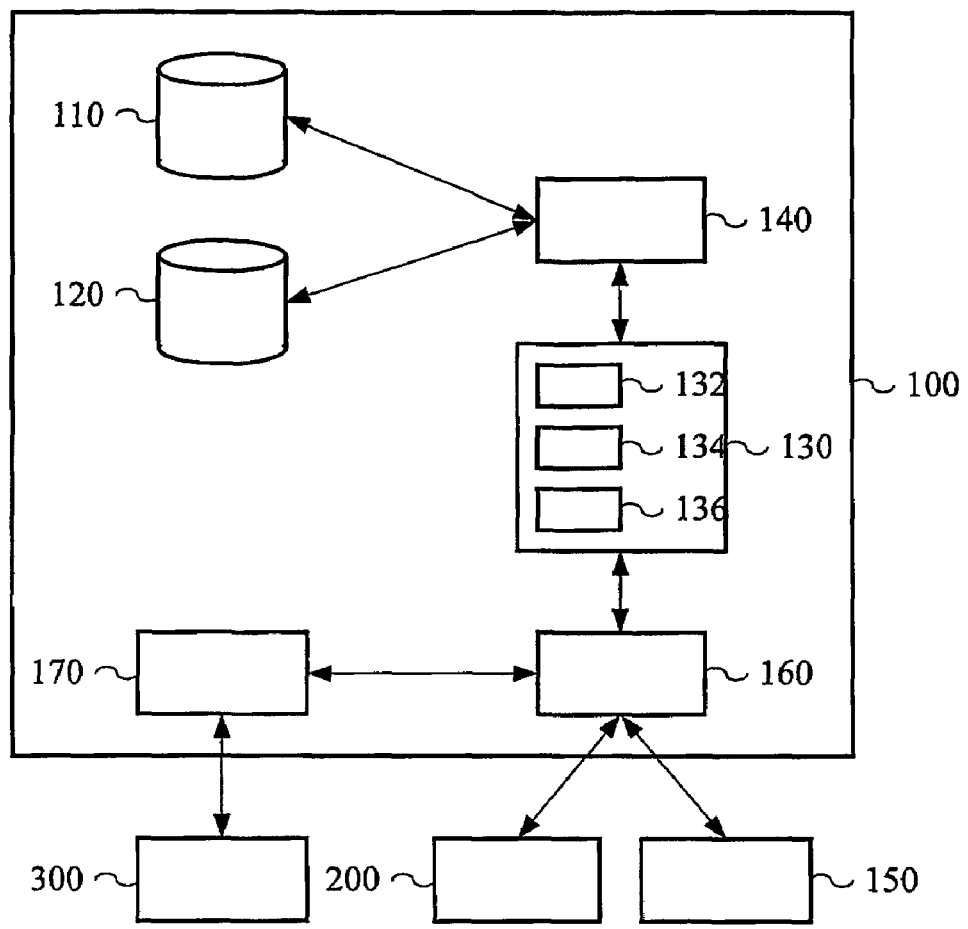

The following definitions will be used to describe the present invention:

Flow system refers to a system of components and the flow of entities between them, and the capabilities of the components concerning the flow, such as the capabilities to store, transport, provide, consume, and control the flow of something. These entities could be anything as long as it obeys conservation laws, e.g., mass, energy, cash, or information flows. In a mass flow system the components may be pumps, tanks, conveyor belts, chemical reactions, biological processes, or other components that are used to maintain flows of mass. In an energy flow, the components may be radiators, batteries, electrical outlets, cords for transmission of electrical energy, and radioactive decay. In an information flow the components may be PID-regulators, sensors, and actuators, but also more abstract components such as information storage on an Internet server, network switches, document delivery systems, and means for verbal communication. A cash flow system may comprise components such as bank accounts, financial transactions, and investments. A flow system may also be called a target system.

Goal refers to the purpose of a flow system or a part of a flow system and is the outcome or result towards which certain activities of the system or the part of the system are directed. A goal could for example be to keep the level of water in a tank high enough and a sub-goal could be to provide electrical power to a pump, which is pumping water to the tank, wherein the sub-goal has to be fulfilled for the main goal to be fulfilled.

Function refers to the capabilities of the components or parts of a flow system, which are used to fulfil the goals, i.e., what the components is doing in order to fulfil the purpose of the system. A source function may for example be used to model the capability of a tank, i.e., to provide an infinite amount of mass, or the capability of a power plant to provide an infinite amount of energy. Further, a transport function may, for example be used to model the capability of a pump, i.e., to move an amount of mass, or the transfer of cash from one account to another, i.e., move an amount of cash. A function may also be used to describe the capability to control the fulfilment of a goal. The manager function may be used to model the capability of the operators of a power plant to control the production of energy, and thereby fulfilling the goal of the power plant. A network function represents the property of parts of the system to provide the conditions necessary to allow other parts of the system to perform their function. The network function is used as a way of grouping several connected flow functions into a flow structure.

The multilevel flow model (MFM) describes the functional structure of a flow system as a set of interrelated flow structures on different abstraction level. The levels are connected via achieve and condition relations, and the flow structures consist of a set of connected functions.

Operating state refers to the operation condition of an entity of a flow system, a component of the flow system or the entire flow system. For example, the operating state of a tank having a removable lid can either be lid is put on or lid is removed, i.e., the tank is either open or closed.

State refers to the qualitative description of an entity of a system or a component of a system, for example, the level in a tank, the flow through a pipe, or the capacity of a battery. The state is shown as a circle in the FIG. 2–10.

State partition refers to a collection of mutually exclusive states for the same entity of a system. For example, the level in a tank may either be too high, too low, or normal, as defined by some external criteria. However, only one state is applicable at a time, for example, the level in the tank may not be too low and too high at the same time. A state partition is indicated as an ellipse containing one or several states, as shown in FIG. 2–10.

Causal rule refers to a causal relationship between the states of two functions modelling parts of a flow system. For example, consider a system where a pump provides water to a tank. If the pump provides too little water, i.e. is in a low flow state this will affect the level in the tank causing it to be in a low volume state. The direction of the causal rules is indicated as an arrow between the functions, as shown in the FIGS. 2–10.

Causal relation refers to a set of one or more casual rules. In some embodiments of the invention, causal relation refers to causal relationships between two functions, and especially between two MFM functions.

It should be emphasised that the term "comprising/comprises" when used in this description is taken to specify the presence of stated features, steps, functions or components but does not preclude the presence of one or more other features, integers, steps, components or groups thereof.

DETAILED DESCRIPTION OF THE INVENTION

The present invention refers to an apparatus, a method and a computer program product that fulfils the above-mentioned object. In general the present invention fulfils the object of the invention by adding an attribute to the causal relation indicating in which operating state or operating states the causal relation is active or not, i.e. indicating in which operating state the causal relation is applicable.

General Setting

An embodiment of an apparatus for modelling causality in a flow system by means of a model devised to model components of the flow system and causal relationships between the components according to the present invention is shown in FIG. 1.

The apparatus 100 is preferably a computerised device 100, such as a computer, and comprises a data storage means 110 configured to store model element data related to said modelled components or modelled parts of the flow system 200. Further the apparatus 100 comprises a causal rule storage means 120 configured to store a plurality of causal rules determining the causal relationships between said model elements, i.e. between functions modelling said components or said parts of the flow system 200.

The storage means 110 and 120 can reside on any per se known memory structure such as a disk memory, read only memory (ROM), random access memory (RAM) or another type of memory structure. In one embodiment of the invention the storage means 110 and 120 are realised as databases. However, the storage means 110 and 120 can also be realised as a single database or comprised in a database.

Further, the apparatus 100 comprises a state determination unit 130, which comprises a receiving means 132 configured to receive from a flow system 200 a status signal relating to a component thereof. An identifying means 134 is further comprised in the state determination unit 130 and configured to identify the component related to the received status signal and to identify a model element modelling the identified component. The state determination unit 130 comprises further a determining means 136 configured to determine an operating state and possibly also a state of the identified component.

Further, the apparatus 100 comprises a processing means 140, such as a central processing unit (CPU), which is communicatively coupled to the data storage means 110, the causal rule storage means 120 and the state determination unit 130. The processing means 140 is configured to activate or deactivate a causal relation related to said identified model element dependent on the determined operating state. The processing means 140 is further arranged to store the determined operating state and the possible determined state in a storage means, such as the causal rule storage means 120.

In an embodiment of the invention, the apparatus 100 also comprises a system interface 160 communicatively coupled to the state determination unit 130. The system interface 160 comprises or is communicatively coupled to a user interface 170 for communication between the apparatus 100 and a user by means of an interaction means 300, a display unit, an input device such as a keyboard or a mouse. Further, the system interface 160 may comprise or be communicatively coupled to a not shown data communication equipment for communication between the apparatus 100 and another device, such as a check and control system (not shown) of the flow system 200 or a service unit 150. The communication is in one embodiment of the invention provided by a two-way communication link. Preferably, the communication link is a wired communication link comprised in for example a local area network (LAN) such as Ethernet. However, another mode of communication, e.g., a point-to-point communication using a modem or a wireless communication link that fulfils the requirements for reliable transmission of information can also be used.

The service unit 150 comprises means, which for example is used to analyse the performance of the flow system or to perform diagnostic reasoning, such as, alarm analysis or fault diagnosis, based on the model of the flow system comprised in the data storage 110.

The computerised device 100 can also comprise operations or procedures stored in a not shown program storage, that allows for verification and validation of the model.

Functional Parts

Figure 1B:
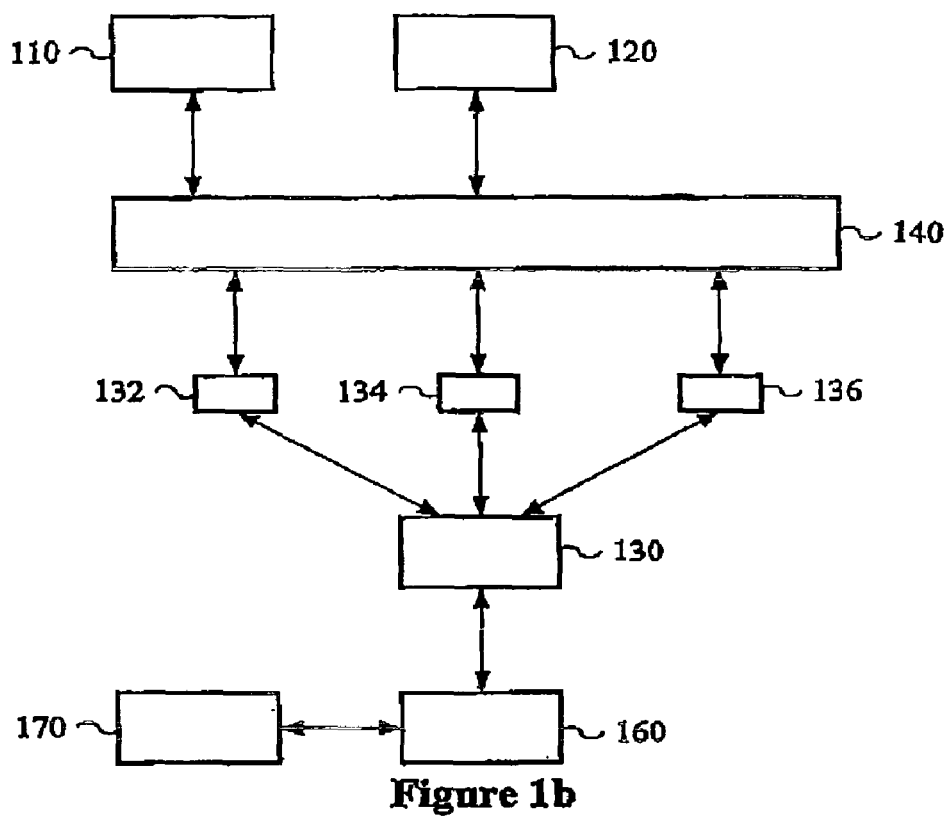

FIG. 1*b* schematically shows functional parts comprised in an embodiment of the apparatus 100 according to the invention. Typically, the functional parts are comprised in a computer program product for use in an apparatus 100 for modelling causality in a flow system, but any or all of the functional parts may be realised as hardware parts of the apparatus 100.

In an embodiment of the invention, the functional parts comprise a control means 140 for activating or deactivating an instance of a causal rule relation related to an identified model element. The activation or deactivation is performed dependent on the determined operating state. The control means 140 is communicatively coupled to means 110 for storing model element data related to the modelled components or modelled parts of the flow system and means 120 for storing a plurality of causal rules determining the causal relationships between interconnected model elements. Further, the control means 140 is communicatively coupled to means 130 for state determination, which means 130 comprises or is communicatively coupled to means 132 for receiving or retrieving from the flow system a status signal relating to a component of the flow system. The means 130 for determination comprises or is communicatively to means 134 for identifying the component related to the received status signal and for identifying a model element modelling the identified component. Means 136 for determining an operating state and possibly also a state of the identified component is further comprised in or communicatively coupled to the means 130 for determination.

The means 130 for determining an operating state is further communicatively connected to a system interface 160, which comprises or is communicatively connected to a user interface 170 for presentation information to a user as well as receiving inputted commands or information concerning the modelling of the flow system, usually in the form a parameter updates. Further, the system interface 160 can comprise or be communicatively coupled to a not shown data communication equipment, which is capable of transferring and receiving data to and from an external structure, such as another computerised device, a service unit or a check and control unit of the flow system.

In the drawings, the lines drawn between different functional parts indicate that the parts are communicatively coupled, physically or by exchanging parameter values. This applies also to units, structures and parts described anywhere in this description.

Causal Rule Storage

The causal rule storage means 120 is configured to store a plurality of instances of causal relations comprising a plurality of causal rules determining the causal relationships between said model elements, i.e. between functions modelling said components or said parts of the flow system. The casual rules are preferably predetermined and prestored in the causal rule storage 120. For each pair of validly interconnected functions the causal rules are stored, preferably prestored, in a set of instances of causal rule matrices, wherein each instance of the causal rule matrix is valid for a predetermined operating state or operating states of the function or functions.

An instance of a causal rule matrix comprises thus information such as the identity of a first function, the operating state of the first function, the identity of a second function and the operating state of the second function. Further the instance of the causal rule matrix comprises information about the causal relationship between the first function and the second function, i.e. information deciding or giving the state of the second function if the first function is in a certain state.

Figure 9:
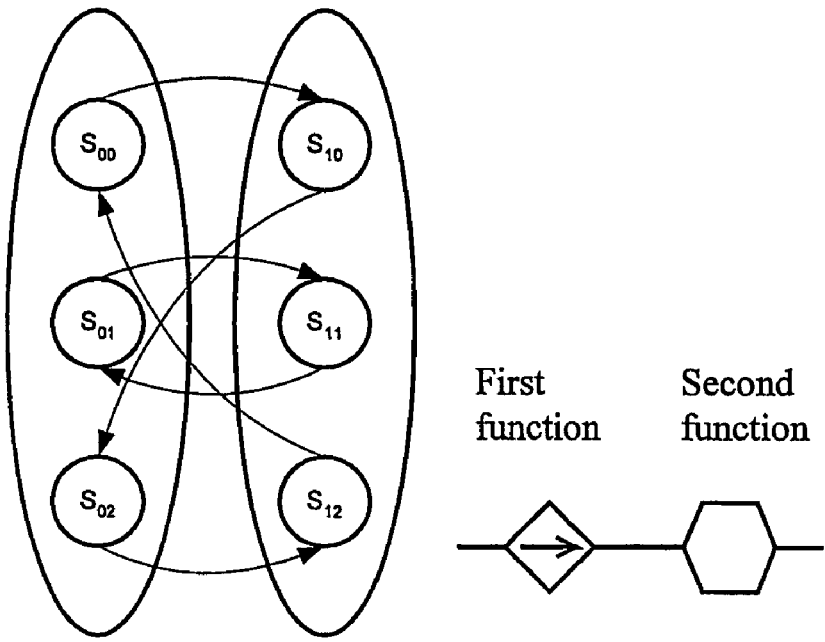
FIG. 9 shows an embodiment of a causal rule matrix for the bidirectional causal relationships as shown in FIG. 2.

An exemplifying embodiment of a casual rule matrix is shown in FIG. 9. The causal rule matrix is valid for certain operating states (not specified) of the first and the second function, respectively. The first function is identified by means of a tag, in this example $S_0$ and the second function is identified by means of $S_1$. However, another suitable identification can be used. Further, the different states of the functions, e.g. the first, second and third state, are indicated with the numbers 0, 1 and 2. In the example, $S_{01}$ indicates that the first function is in the second state and $S_{11}$ indicates that the second function is in the second state. The number 1 in the box where the row of $S_{01}$ intersects the column of $S_{11}$ gives that if the first function is in the second state it causes the second function to be in the second state.

Further, the causal rule storage means 120 is configured to store a plurality of logical functions or logical rules used to determine the operating state of the components of the flow system dependent on a status signal or status signals received from the flow system. The logical functions are preferably predetermined but they can also be determined during the operation of the flow system.

State Determination Unit

As mentioned above, the state determination unit 130 comprises a receiving means 132, an identifying means 134 and a determining means 136. The receiving means 132 is in one embodiment of the invention communicatively coupled to the system interface 160, whereby the receiving means 132 is arranged to receive at least one status signal from a modelled flow system communicatively connected to the system interface 160. The flow system transfers or transmits status signals to the receiving means 132 either on request from the receiving means 132 or automatically. In some embodiments of the invention, the receiving means 132 receives a status signal from the flow system at predetermined time intervals but the receiving means 132 can also be arranged to receive status signals at arbitrary points of time. However, the receiving means 132 can also be arranged to retrieve status signals from the flow system or from a storing means, wherein the status signals are stored by for example the flow system.

When a status signal is received or retrieved by the receiving means 132, the identifying means 134 identifies the component related to the received status signal and the corresponding function, i.e. the model element modelling the component. Further, the determining means 136 is arranged to determine the operating state of the component as a logical function of the status signal. In one embodiment of the invention the logical functions determining the operating state of a tank, e.g. lid on or off, can for example be described as:

IF t001_lid=1 THEN t_opstate=0
IF t001_lid=0 THEN t_opstate=1

In this example, t001_lid is a status signal indicating whether the lid is on or off the tank t_001, thus if t001_lid is 1 then the operating state of the tank is 0, e.g. the lid is on, i.e. the tank is closed. Further, if t00_1 is 0 the operating state of the tank is 1, e.g. the lid is off, i.e. the tank is open.

However, the operating state for a component or a part of the flow system can be determined by means of more complex logical functions either as a multiple of logical statements comprising AND/OR-statements, or as a logical function/logical functions of several received or retrieved status signals.

The determining means 136 is also arranged to determine the state of the component or of the part of the flow system or even of the entire flow system. In one embodiment of the invention, the state is determined by comparing the information of the received status signal with limit values giving that the state is for example high, normal or low. For example, the state of a tank can be determined by means of logical functions dependent of the status signal indicating the level in the tank, e.g. t001_level. The logical functions can in this example be described as IF t001_level>=0 AND t001_level<25 THEN t_state=0
IF t001_level>=25 AND t001_level<50 THEN t_state=1
IF t001_level>=50 THEN t_state=2

That is, if the level in the tank is equal or larger than 0 and lesser than 25 then the state of tank, t_state, is 0, e.g. the tank is in a low state. If the level in the tank is equal or larger than 25 and lesser than 50 then the tank is in the state 1, e.g. in a normal state and if the level in the tank is larger than 50 the tank is in the state 2, e.g. in a high state.

The limit values, possible logical functions and the corresponding states are stored, preferably prestored, in the data storage 110, in the causal rule storage 120 or in another storing means. However, in some embodiments of the invention, the received status signal comprises information about the state of the component or the function modelling the component, whereby it is not necessary for the determining means 136 to determine the state.

Some flow systems are provided with a number of redundant sensors to increase the reliability in the sensor signals. In such cases, the determining means 136 can be provided with functionality to compare the sensor signals and to determine which one or which of the sensor signals to rely on. When a reliable sensor signal or sensor signals is/are determined, the determining means 136 determines the operating state as a logical function of the reliable sensor signal(-s) and possibly also the states dependent on the information comprised in the reliable sensor signal(-s).

Processing Means

As mentioned above, the apparatus 100 according to the present invention comprises a processing means 140, which is communicatively coupled to the data storage means 110, the causal rule storage means 120 and the state determination unit 130. The processing means 140 is configured receive information about the identified model element and the operating state of the model element from the state determining unit 130. Further the processing means 140 is configured to activate or deactivate a causal relation, i.e. an instance of a causal rule matrix, corresponding to the identified model element and dependent on the determined operating state of the component or the function modelling the component.

In one embodiment of the invention, the processing means 140 has to receive information about both the interconnected functions in order to be able to activate or deactivate an appropriate causal relation, i.e. an instance of a causal rule matrix. In other words, the processing means 140 needs to receive both the identity and the operating state of the first and second function, respectively, in order to be able to activate or deactivate an appropriate instance of a causal rule matrix.

However, the processing means 140 can also activate or deactivate a causal rule matrix when receiving a status signal from only one of two interconnected functions, e.g. from a first function but not from a second function. In this case, the processing means 140 retrieves the operating state for the second function from a storage means, for example the causal rule storage means 120. Thus the processing means 140 is capable of activating or deactivating an instance of a causal rule matrix corresponding to the operating states of the first and second interconnected functions.

Method for Modelling Causality in a Flow System

Figure 12:
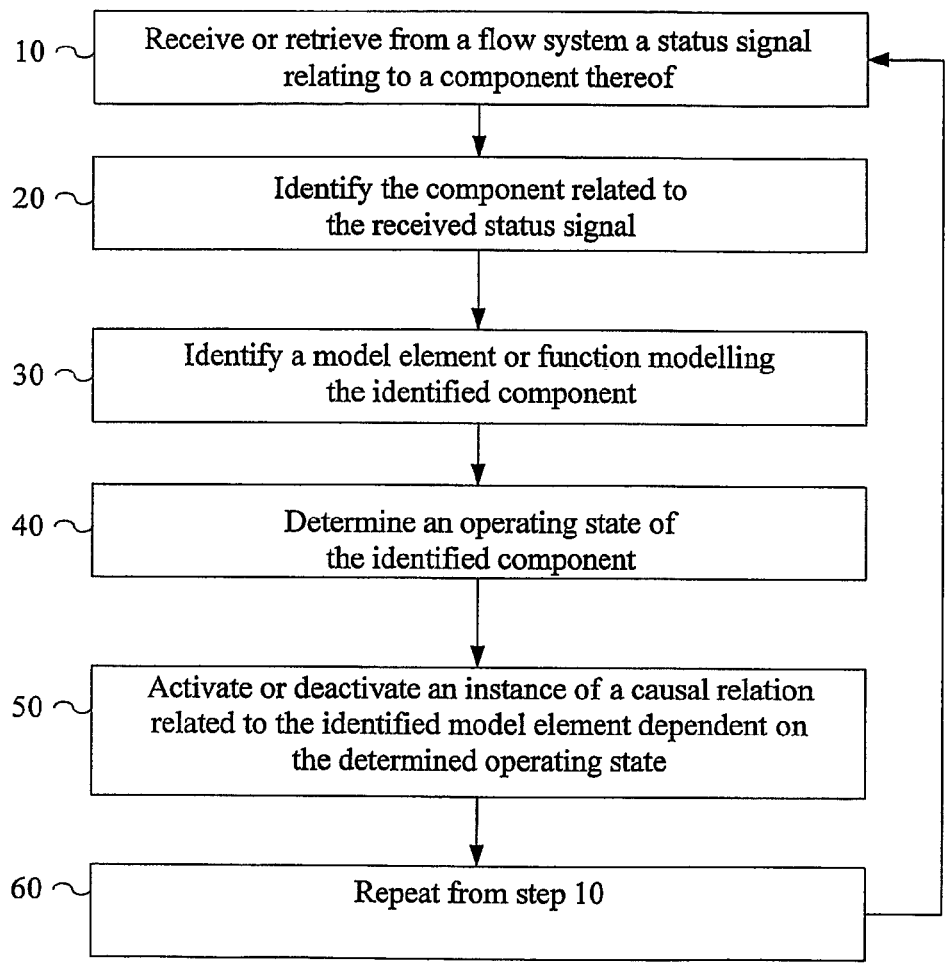
FIG. 12 shows a schematic flow chart of the general method steps for modelling causality according to an embodiment of the invention.

Generally, the method for modelling causality in a flow system by means of a model devised to model components of said flow system and causal relationships between said components, comprises the steps of (cf. FIG. 12):

10 receiving or retrieving from said flow system a status signal relating to a component thereof;
12 identifying said component related to said received status signal;

14 identifying a model element or function modelling said identified component;

16 determining an operating state of said identified component;

18 activating or deactivating an instance of a causal relation, i.e. an instance of a causal rule matrix, related to said identified model element dependent on said determined operating state; and 20 repeating the steps from step 10.

In step 10 a status signal relating to a component or a part of the flow system is received from the flow system in the receiving means 132, wherein in step 12 the component or the part of the flow system is identified by means of an identifying means 134. Further, in step 14 the identifying means 134 identifies the modelling element modelling the identified component or the identified part of the flow system. A determining means 136 determines in step 16 an operating state of the identified component or the identified part of the flow system. The determining means 136 can also be arranged to determine a state of the identified component or the identified part of the flow system, either by comparing information comprised in the status signal with limit values or by directly receiving the state from the status signal. In step 18, a processing means 140 activates or deactivates a causal relation, i.e. an instance of a causal rule matrix, related to said identified model element and dependent on said determined operating state. In step 20 the steps are repeated from step 10.

A service unit 150 can further be communicatively coupled to the processing means 140, whereby the service unit 150 is controllable by means of the processing means 140. The service unit 150 is in one embodiment of the invention arranged to utilise the state of the component and the activated instance of a causal rule matrix to execute steps of a diagnostic method. For example, the service unit 150 is arranged to perform diagnostic reasoning, such as, alarm analysis or fault diagnosis, based on the model of the flow system comprised in the data storage 110.

EXAMPLE

A Multilevel Flow Model (MFM)

In MFM the added attribute to the causal relation indicates in which state a causal rule of the causal relation is active or not and can be shown graphically by adding a new modelling element indicating the direction in which the MFM functions affect each other. In the FIGS. 3b, 4b, 5b, 6b, 7b and 8b, examples of modelling elements indicating the direction in which the MFM functions affect each other is illustrated as an arrow between the functions. However, in the case of bidirectional effect no arrow is used.

The invention will now be exemplified by refers to FIGS. 2–10, wherein the shown states from the top of the state partitions and downwards are high, normal and low. However, it should be understood that the states are given as an example only.

Figure 2A:
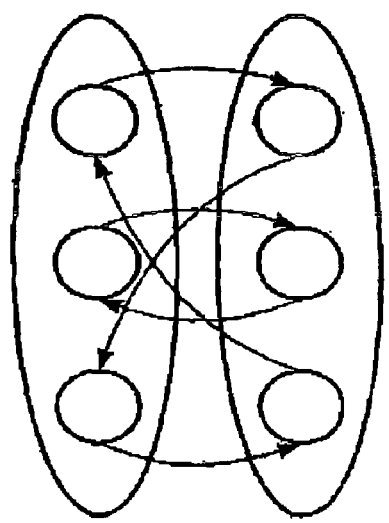
FIG. 2a shows schematically state partitions of bidirectional causal relationships between a transport function and a storage function shown in FIG. 2b.
Figure 2B:

In the exemplifying FIG. 2a, a bidirectional causal relation, having bidirectional causal rules, is shown, indicating that the MFM functions shown in FIG. 2b, i.e. the transport function and the storage function, affect each other. The left state partition shown in FIG. 2a refers to the states of the transport function and the right state partition refers to the states of the storage function. From FIG. 2a it is apparent that a high state of the transport function causes a high state of the storage function. Further, a low state in the storage function causes a high state in the transport function. Thus, FIG. 2a shows how the different states of the transport function affect the states of the storage function and vice versa. In the case of a bidirectional causal relation, all the states of both the transport function and the storage function are active, i.e. all the defined causal rules of the causal relation are activated or applicable. Further, FIG. 2b shows an example of a graphical representation of the bidirectional causal relation between the transport function and the storage function.

Figure 3A:
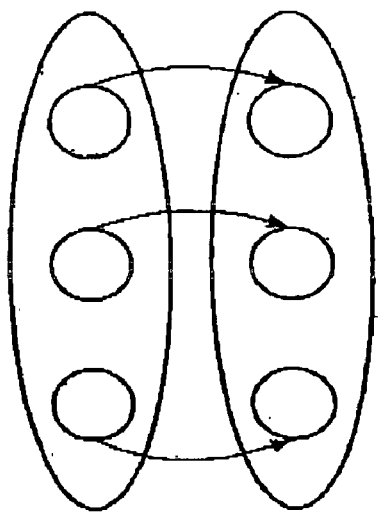
FIG. 3a shows schematically state partitions of unidirectional causal relationships between a transport function and a storage function shown in FIG. 3b.
Figure 3B:
Figure 4A:
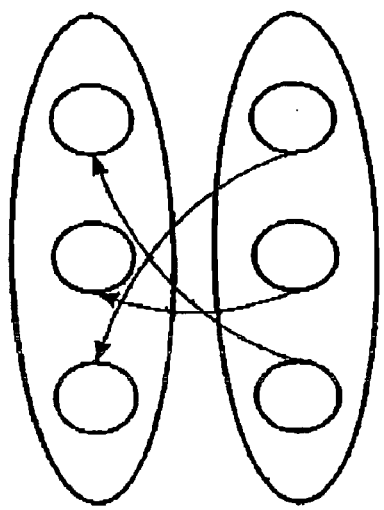
FIG. 4a shows schematically state partitions of other unidirectional causal relationships between a transport function and a storage function shown in FIG. 4b.
Figure 4B:

A unidirectional causal relation is shown in FIGS. 3 and 4. FIG. 3a shows the states partitions of the unidirectional causal relation, wherein the state of the transport function affects the state of the storage function, but not the other way around, i.e. the state of the storage function does not affect the state of the transport function. The unidirectional relation shown in FIG. 4a illustrates that the state of the storage function affects the state of the transport function, but not vice versa. Further, in the FIGS. 3b and 4b are examples of graphical representations of the unidirectional relations shown.

Figure 5A:
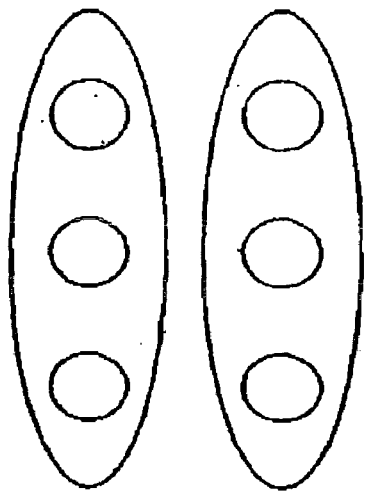
FIG. 5a shows schematically state partitions when neither the transport function nor the storage function, shown in FIG. 5b, affects each other.
Figure 5B:

In FIG. 5 is the case when none of the functions effect the other function shown. In this case, neither a state of the transport function nor a state of the storage function is active. Thus, there are no active causal rules since there is no cause and effect relationships between the transport function and the storage function.

FIGS. 6–8 show examples of partly-bidirectional causal relations between a transport function and a storage function.

Figure 6A:
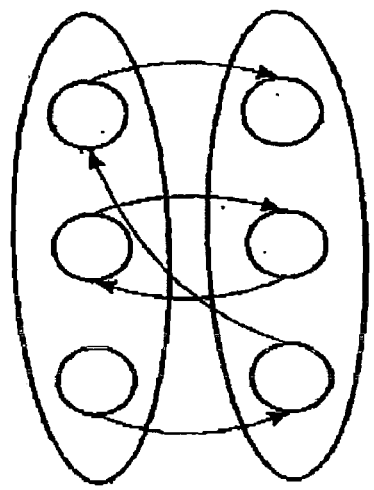
FIGS. 6a, 7a and 8a shows schematically state partitions of partly-bidirectional causal relationships between a transport function and a storage function as shown in FIGS. 6b, 7b and 8b, respectively.
Figure 6B:
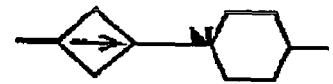

In FIG. 6a is shown how the states of the transport function affect the states of the storage function. Further, FIG. 6a shows how the normal state and low state of the storage function affect the normal state and the high state, respectively, of the transport function. However, as shown in this example the high state of the storage function does not affect the state of transport function. In FIG. 6b is an example of a graphical representation of this case shown.

Figure 7A:
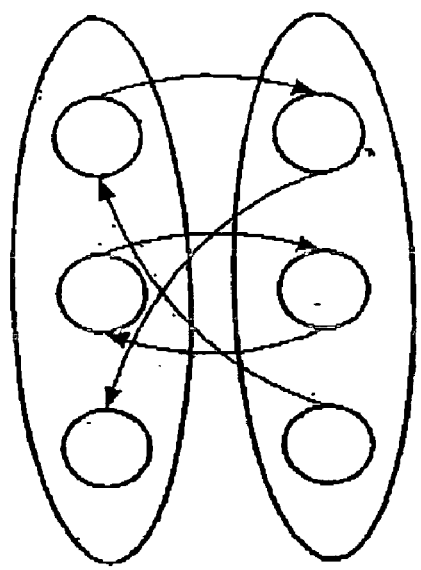
Figure 7B:

FIG. 7a shows how the states of the storage function affect the states of the transport function and how the high state and the normal state of the transport function affects the high state and the normal state, respectively, of the storage function. As shown in FIG. 7a, the low state of the transport function does not affect the state of the storage function. Further, in FIG. 7b is an exemplifying graphical representation of this case shown.

Figure 8A:
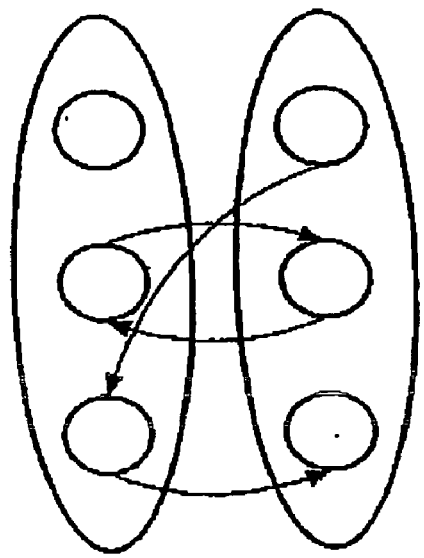
Figure 8B:

FIG. 8a shows another case, wherein the high state and the normal state of the storage function affects the low state and the normal state of the transport function. Further, the low state of the storage function does not affect the state of the transport function and the high state of the transport function does not affect the state of the storage function.

In the examples described above with reference to the FIGS. 2–8 only two kinds of functions, modelling the causality of parts of a flow system, have been discussed. However, it should be understood that the inventive concept is also applicable to other functions modelling parts of the flow system. For example, all validly connected functions can model the causality of parts of a modelled flow system.

Further, the number of states of the functions in the examples is three, but it should be understood that the number of states for each function can be arbitrary varied. It should also be understood that the number of states for two functions does not have to be equal. For example, a first function can have n states and a second function can have m states. This latter case can be handled by means of a generic causal rule matrix. The matrix will then have the size of $(m+n) \times (m+n)$, where n is the number of states in the state partition of the first generic function and m is the number of states in the state partition of the second generic function.

Figure 10:
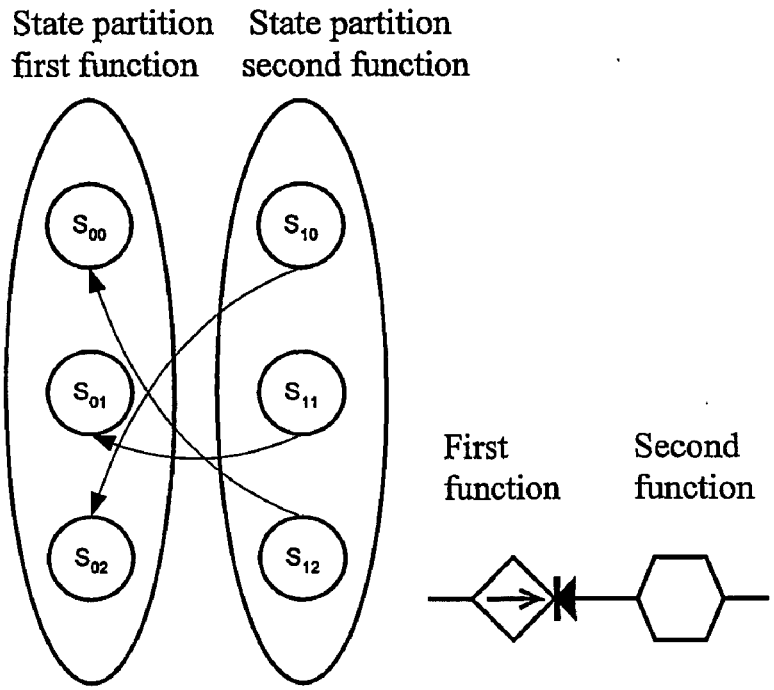
FIG. 10 shows an embodiment of a causal rule matrix for the unidirectional causal relationships as shown in FIG. 4.
Figure 11:
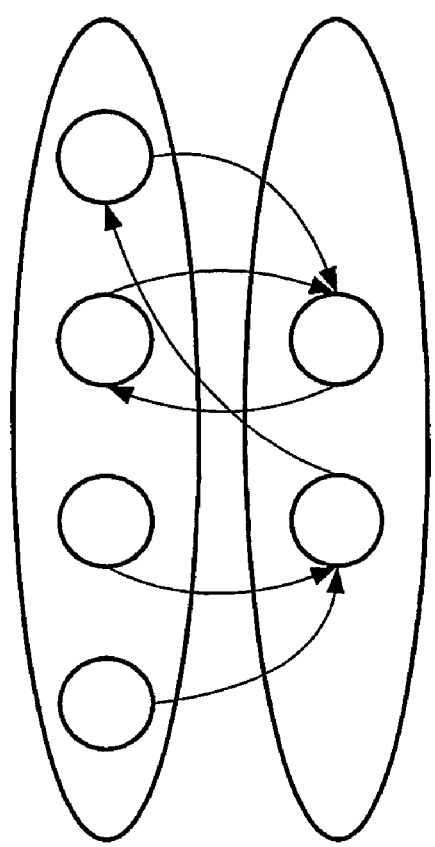
FIG. 11 shows an exemplifying embodiment of state partitions of bidirectional causal relationships between a first function having four states and a second function having two states.

FIG. 9 shows the causal rule matrix for the bidirectional case described with reference to FIG. 2 and FIG. 10 shows the causal rule matrix for the unidirectional case described with reference to FIG. 4.

The number one, or another type of tag, in one of the cells of the matrix represents a causal rule from the state represented by the row in the matrix to the state represented in the column of the matrix. The casual rule should be interpreted as: "If a first function is in a state given by a row then the first function causes a second function to be in a state given by a column."

As shown in the FIG. 9, if a first function, e.g. a transport function (cf. FIGS. 2a and 2b), is in a state $S_{00}$ it causes a second function, e.g. a storage function, to be in the state $S_{10}$, and if the first function is in a state $S_{01}$ it causes the second function to be in a state $S_{11}$. Further, if the second function is in a state $S_{10}$ it causes the first function to be in a state $S_{02}$.

As shown in FIG. 10, if the first function, i.e. the transport function (cf. FIGS. 3a and 3b), is in any of the states $S_{00}$, $S_{01}$ or $S_{02}$ it does not affect the state of the second function, i.e. the storage function. However, if the second function, i.e. the storage function, is in the state $S_{10}$ it will cause the first function to be in the state $S_{02}$, and if the second function is in the state $S_{11}$ it will cause the first function to be in the state $S_{01}$. Finally, if the second function is in the state $S_{12}$ it will cause the first function to be in the state $S_{00}$.

The invention claimed is:

1. An apparatus for modelling causality in a flow system by means of a model devised to model components of said flow system and causal relationships between said components, wherein said apparatus comprises:
    a data storage means configured to store model element data related to said modelled components;
    a causal rule storage means configured to store a plurality of causal relations determining the causal relationships between said model elements;
    a state determination unit comprising
    a receiving means configured to receive from said flow system a status signal relating to a component thereof;
    an identifying means configured to
        identify said component related to said received status signal;
        identify a model element modelling said identified component;
    a determining means configured to determine an operating state of said identified component dependent on said status signal; and
    a processing means communicatively coupled to said data storage means, said causal rule storage means and said state determination unit, and configured to dynamically activate or deactivate a causal relation related to said identified model element and dependent on said determined operating state.

2. The apparatus according to claim 1, wherein said processing means is configured to dynamically activate or deactivate a causal relation during the operation of the flow system.

3. The apparatus according to claim 1 or 2, wherein said causal rule storage means is configured to store a causal relation for an operating state of a model element.

4. The apparatus according to claim 3, wherein said causal rule storage means is configured to store said causal relation as a causal rule matrix.

5. The apparatus according to claim 1 or 2, wherein said determining means is arranged to determine said operating state based on a logical function of said status signal.

6. The apparatus according to claim 1 or 2, wherein said determining means is arranged to provide a state of said identified component.

7. The apparatus according to claim 6, wherein a service unit is communicatively coupled to and controllable by means of said processing means, said service unit is arranged to execute steps of a diagnostic method utilising said state and said activated causal relation.

8. The apparatus according to claim 1 or 2, wherein said model is a qualitative model.

9. The apparatus according to claim 1 or 2, wherein said model is a rule based model.

10. The apparatus according to claim 1 or 2, wherein said model is a functional model.

11. The apparatus according to claim 10, wherein said functional model is a multilevel flow model.

12. A method for modelling causality in a flow system by means of a model devised to model components of said flow system and causal relationships between said components, wherein the method comprises the steps of:
    receiving from said flow system a status signal relating to a component thereof;
    identifying said component related to said received status signal:
    identifying a model element modelling said identified component;
    determining an operating state of said identified component dependent on said status signal; and
    dynamically activating or deactivating a causal relation related to said identified model element and dependent on said determined operating state.

13. The method according to claim 12, wherein the step of dynamically activating or deactivating a causal relation is performed during the operation of the flow system.

14. The method according to claim 12 or 13, wherein said causal rule storage means stores a causal relation for an operating state of a model element.

15. The method according to claim 14, wherein said causal rule storage means stores said causal relation as a causal rule matrix.

16. The method according to claim 12 or 13, wherein the step of determining said operating state further comprises the step of determining said operating state based on a logical function of said status signal.

17. The method according to claim 12 or 13, wherein said determining means provides a state of said identified component.

18. The method according to claim 17, wherein said processing means controls a service unit to execute steps of a diagnostic method utilising said state and said activated causal relation.

19. The method according to claim 12 or 13, wherein said model is a qualitative model.

20. The method according to claim 12 or 13, wherein said model is a rule based model.

21. The method according to claim 12 or 13, wherein said model is a functional model.

22. The method according to claim 21, wherein said functional model is a multilevel flow model.

23. A computer program product for use in a computerised apparatus for modelling causality in a flow system by means of a model devised to model components of said flow system and causal relationships between said components, wherein the computer program product comprises:

means for storing mode element data related to said modelled components;

means for storing a plurality of instances of causal relations determining the causal relationships between said model elements;

means for state determination comprising means for receiving from said flow system a status signal relating to a component thereof;

means for identifying said component related to said received status signal and for identifying a model element modelling said identified component;

means for determining an operating state of said identified component dependent on said status signal; and means for dynamically activating or deactivating an instance of a causal relation related to said identified model element and dependent on said determined operating state.

24. The computer program product of claim 23, wherein the means for dynamically activating or deactivating an instance of a causal relation is configured to dynamically activate or deactivate an instance of a causal relation during the operation of the flow system.

25. A computer program product for use in a computerised apparatus for modelling causality in a flow system by means of a model devised to model components of said flow system and causal relationships between said components, wherein the computer program product comprises means for providing the functions or steps according to claim 1 or 12.

* * * * *